Jan. 26, 1954 E. M. CREAMER, JR., ET AL 2,667,534

ELECTRICAL SYSTEM

Filed Aug. 4, 1951 3 Sheets-Sheet 1

INVENTORS
EDGAR M. CREAMER, JR.
MELVIN E. PARTIN
BY Allen V. Hazeltine
ATTORNEY

ELECTRICAL SYSTEM

Filed Aug. 4, 1951

3 Sheets-Sheet 2

INVENTORS
EDGAR M. CREAMER, JR.
MELVIN E. PARTIN
BY
Allen V. Hazeltine
ATTORNEY

Jan. 26, 1954 E. M. CREAMER, JR., ET AL 2,667,534

ELECTRICAL SYSTEM

Filed Aug. 4, 1951 3 Sheets-Sheet 3

INVENTORS
EDGAR M. CREAMER, JR.
MELVIN E. PARTIN
BY
Ogden V. Hazeltine
ATTORNEY

Patented Jan. 26, 1954 2,667,534

UNITED STATES PATENT OFFICE 2,667,534

ELECTRICAL SYSTEM

Edgar M. Creamer, Jr., and Melvin E. Partin, Philadelphia, Pa., assignors to Philco Corporation, Philadelphia, Pa., a corporation of Pennsylvania Application August 4, 1951, Serial No. 240,324

18 Claims. (Cl. 178—5.4)

The present invention relates to cathode ray tube systems and more particularly to cathode ray tube systems in which the position of the electron beam relative to a beam interceptive structure of the tube is indicated by an indexing member so arranged in cooperative relationship with the beam interceptive structure as to produce a signal whose time of occurrence is indicative of the time at which the cathode ray beam attains a predetermined position.

There are a variety of circumstances in which it is desirable to produce and to utilize signals whose times of occurrence are indicative of those times at which a cathode ray beam attains predetermined positions. For example, in the copending application of David E. Sunstein, Serial No. 185,106, filed September 15, 1950, and assigned to the assignee of the present invention, there is described a color television image presentation system utilizing a single cathode ray tube having a screen member comprising vertical stripes of luminescent materials which respond to electron impingement to produce light of three different primary colors. These stripes are preferably arranged in laterally displaced color triplets, each triplet comprising three vertical phosphor stripes producing light of different primary colors. The order of arrangement of the stripes may be such that the normally horizontally scanning cathode ray beam produces red, blue and green light successively upon impingement of successive stripes. Such a cathode ray tube may be incorporated in a color television receiver which produces three separate video signals, each indicative of a different primary color component of a televised scene, which signals are sampled sequentially and utilized to control the intensity of the cathode ray beam. For proper color rendition, it is then required that, as phosphor stripes producing each of the primary colors of light are impinged by the cathode ray beam, the intensity of the beam be simultaneously controlled in response to the contemporaneous value of the video signal representing the corresponding color component of the televised scene. However, since the rate at which the beam scans across the phosphor stripes of the screen may vary due, for example, to nonlinearity of the beam deflecting signal, the times at which the samples of the several video color signals should be taken will generally not occur exactly periodically. To effect proper timing of the sampling operations, it is therefore desirable to derive signals indicative of the instantaneous position of the cathode ray beam upon the image forming screen and to utilize these so-called indexing signals to control the times at which the samplings of the several color signals are effected. Although certain of the systems embodying the invention which are described hereinafter are of the type that utilize the signals indicative of the beam position for purposes of timing the sampling of color signals in a color television receiver, it will be obvious from the following that the invention is in no way dependent upon such use, and that the signals produced by the arrangement of the invention may be utilized for other purposes as well. For example, use may be made of the invention in controlling the times and rate of occurrence of intervals at which a signal is representative of color information in the case where the signal has been previously sampled at an independently determined rate so as to be initially representative of color information at independently determined intervals. Again, use may be made of the invention in effecting linearization of the deflection of a cathode ray beam, in a system according to the disclosure of copending U. S. application of Wilson P. Boothroyd, Serial No. 219,093, filed April 3, 1951, and assigned to the assignee of the present invention.

In the copending application of Carlo V. Bocciarelli, Serial No. 198,709, filed December 1, 1950, and assigned to the assignee of the present invention, there is described and claimed a cathode ray tube system in which the indexing signal hereinbefore mentioned is derived from a plurality of stripe members arranged on the beam intercepting screen structure, which members comprise a material having secondary emission properties which differ from the secondary emission properties of the remaining portions of the beam intercepting structure. The indexing stripe members are arranged each over a corresponding phosphor stripe serving to generate one of the primary colors, so that, when the beam impinges upon the phosphor stripe, the indexing member is simultaneously excited and the resultant secondary emission produces a pulse in a suitable output circuit.

In the case of a cathode ray tube system for color television, the indexing member may consist of a material of high atomic number, such as gold, platinum or tungsten, or it may consist of certain mixtures including magnesium or magnesium oxide, and the remainder of the beam intercepting structure may be provided with a coating of a material having a detectably different secondary emission ratio, such as aluminum, which coating also serves as a light reflecting mirror for the phosphor stripes in accordance with well known practice.

Because of the high accelerating voltages of the order of 10 to 20 kilovolts normally used in the systems under consideration, the difference in secondary emission between the indexing stripes and the aluminum coating is relatively small, and in many instances there exists the danger that the normally detectable difference in voltage appearing at the collector electrode system may be masked or at least contaminated by spurious voltages. Such spurious voltages may derive, for example, from the video signal itself which appears in the collector electrode system because of the fact that the collector electrode signal voltage is a function of the intensity of the cathode ray beam and in the normal course of events the cathode ray beam is intensity modulated by the video signal at the time that the beam impinges on the indexing stripe member.

It is, accordingly, a principal object of the invention to provide a cathode ray tube system of the type in which the position of the electron beam relative to a beam intercepting member is indicated by an indexing member and in which a clearly defined indexing signal voltage is generated.

A further object of the invention is the provision of a cathode ray tube system in which the indexing signal voltage generated is substantially free of spurious signal voltages.

A further object of the invention is the provision of a cathode ray tube system which permits simple and inexpensive separation of the video and indexing signals, whereby an index signal voltage substantially free of video components, or indeed of any other extraneous components, is obtained.

To achieve the foregoing objects as well as others which will appear, systems constructed in accordance with our invention employ a cathode ray tube having disposed therein a beam interceptive structure comprising beam position indicating or "indexing" elements arranged in predetermined geometric relation to other portions of the beam interceptive structure. These beam position indicating elements are characterized by having values of secondary emission ratio which differ from those characterizing other regions of the beam interceptive structure, when electrons of the cathode ray beam impinge thereon. By reason of these characteristics, as the beam is swept across the screen structure so as to traverse the boundaries between regions of different secondary emission ratio, a signal voltage is generated in the output collector electrode having variations corresponding to the differences between the secondary emission ratios. However, since the voltage at the collector electrode is also a function of the intensity of the beam, and also because of random noise voltages generated by the beam, the signal voltage produced contains spurious signal components constituted by video and by noise modulation of the beam intensity. Attempts at separating, from the several voltage components appearing in the collector electrode circuit, those components which are due only to variations in secondary emission ratio have been complicated by the fact that components produced by such variations in secondary emission ratio lie in substantially the same frequency range as do components produced by video or noise modulation of the beam. Instead of attempting such separation, a system embodying our invention incorporates a source of periodic carrier signal voltage of a frequency substantially different from any frequency which the video beam modulating signal may assume. This signal voltage is applied to the beam intensity control grid of the cathode ray tube together with the video signal, care being taken to keep the amplitude of this carrier signal voltage sufficiently small so that its fluctuations will produce no substantial departures in the light emitted by the tube screen structure from that due to video modulation of the beam in the absence of carrier. As a result of the application to the beam intensity control grid of this additional signal voltage, there appear, in the collector electrode circuit, signal voltage components which vary in proportion to the beam intensity variations produced by this additional signal voltage. Furthermore, the amplitude of these latter variations are caused to change in proportion to variations in secondary emission of the screen structure as the electron beam is swept across regions of different secondary emission ratios. It is apparent that the signal components produced in the collector electrode circuit by this additional carrier signal voltage, and which are amplitude modulated in accordance with the rate of traversal of indexing elements in the screen structure, are readily separable from similarly modulated video and noise components simply by virtue of the fact that these are in a substantially different frequency range as a result of the selection of the frequency of this additional signal voltage in the manner hereinbefore mentioned. The only additional step required to produce an indexing signal, uncontaminated by the aforesaid video or noise components, is the detection of this index modulated carrier signal voltage so as to reproduce a signal voltage which varies only in proportion to variations in emission as the electron beam sweeps across regions of different secondary electron emission ratio. The particular manner of the operation and construction of various systems embodying our invention is set forth at length in the following description of certain representative embodiments which will be readily understood by reference to the accompanying figures wherein:

Figures 2, 3:
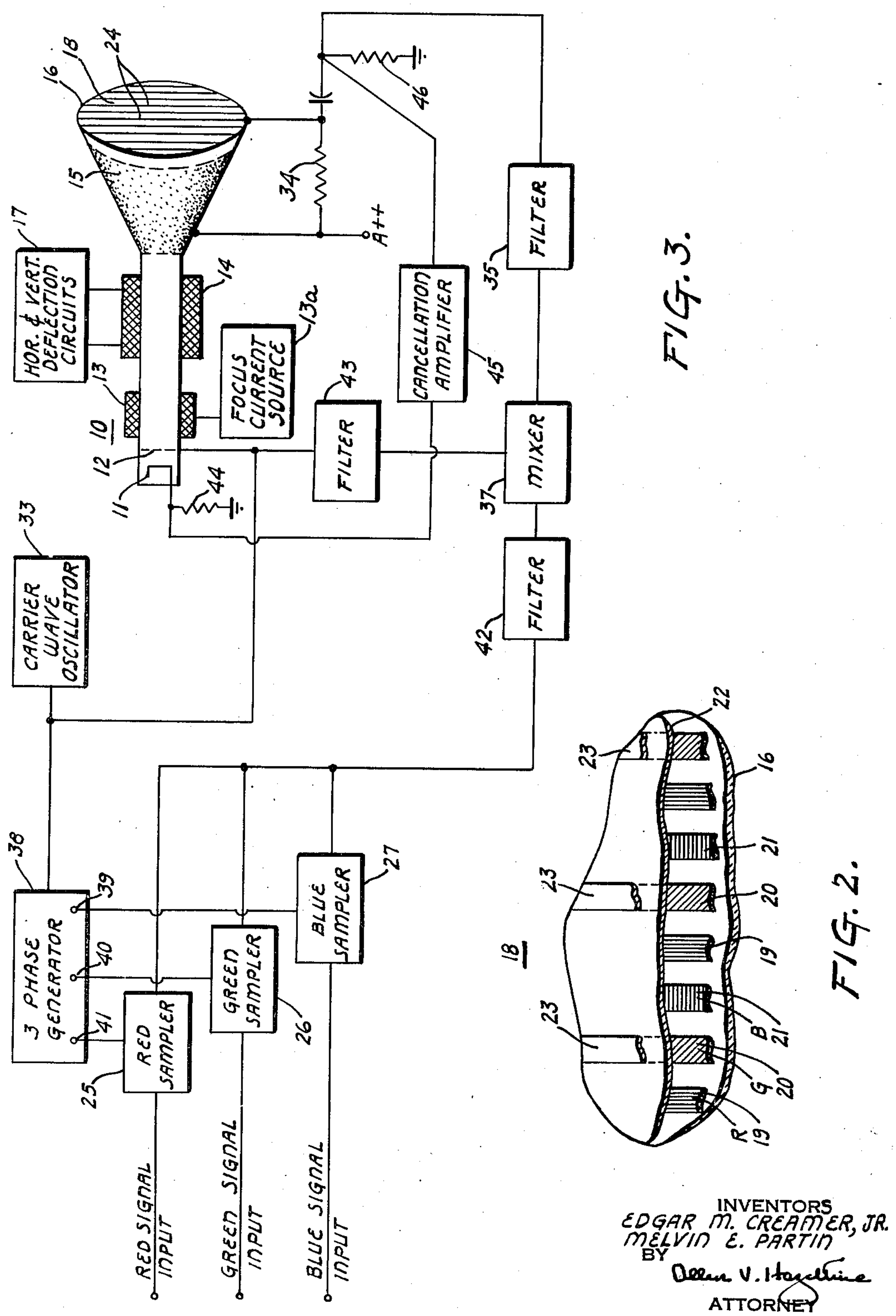
Figure 2 is a greatly enlarged, fragmentary view of the screen structure of the cathode ray tube incorporated in the system of Figure 1.
Figure 4:
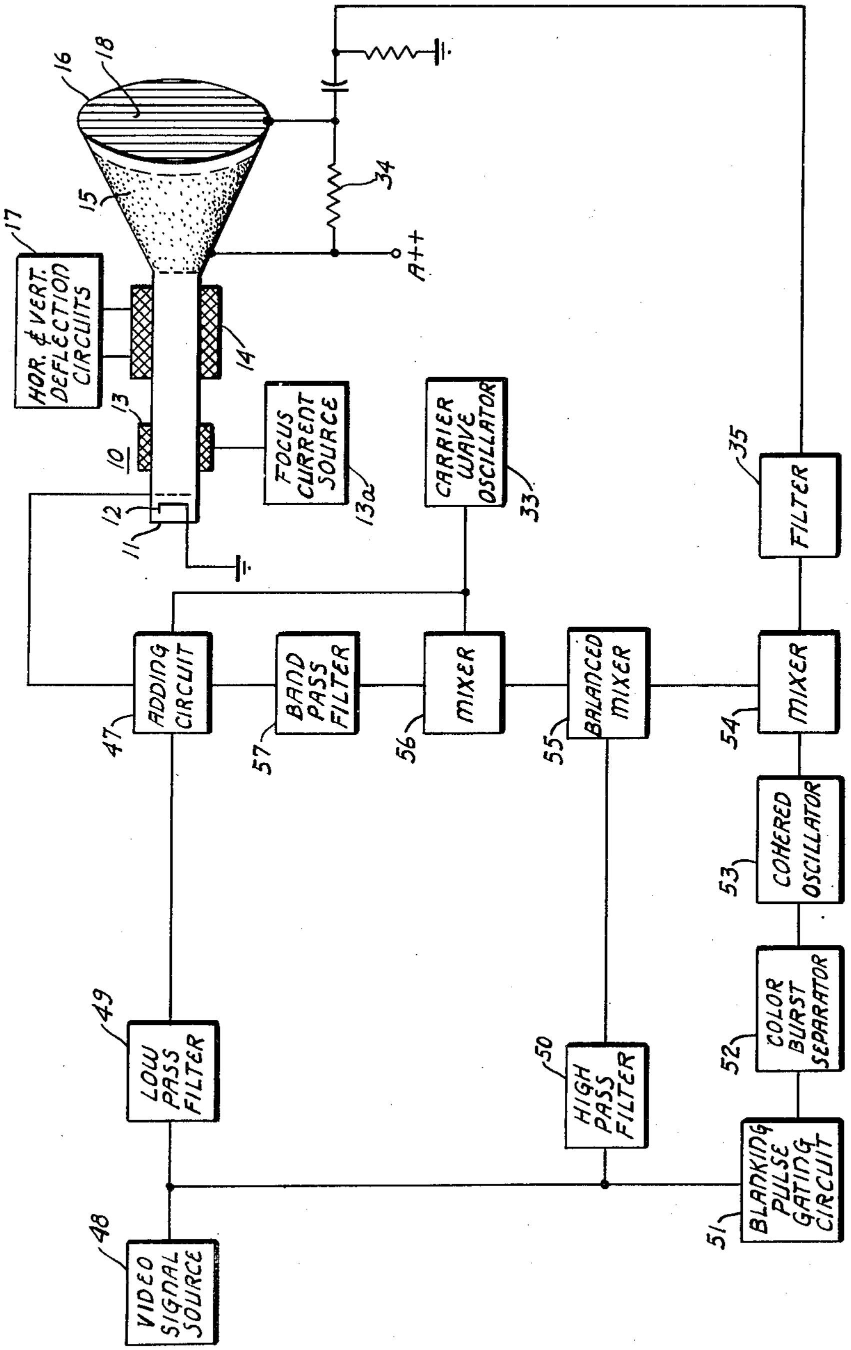

Figure 3 illustrates a preferred embodiment of the invention wherein the aforementioned source of carrier signal voltage is utilized to overcome certain deficiencies arising from otherwise unavoidable time lags associated with index controlled color systems in addition to performing its essential role in the purification of these index signals; and Figure 4 illustrates the embodiment of our invention in another type of color television receiver possessing certain advantages.

Figure 1:
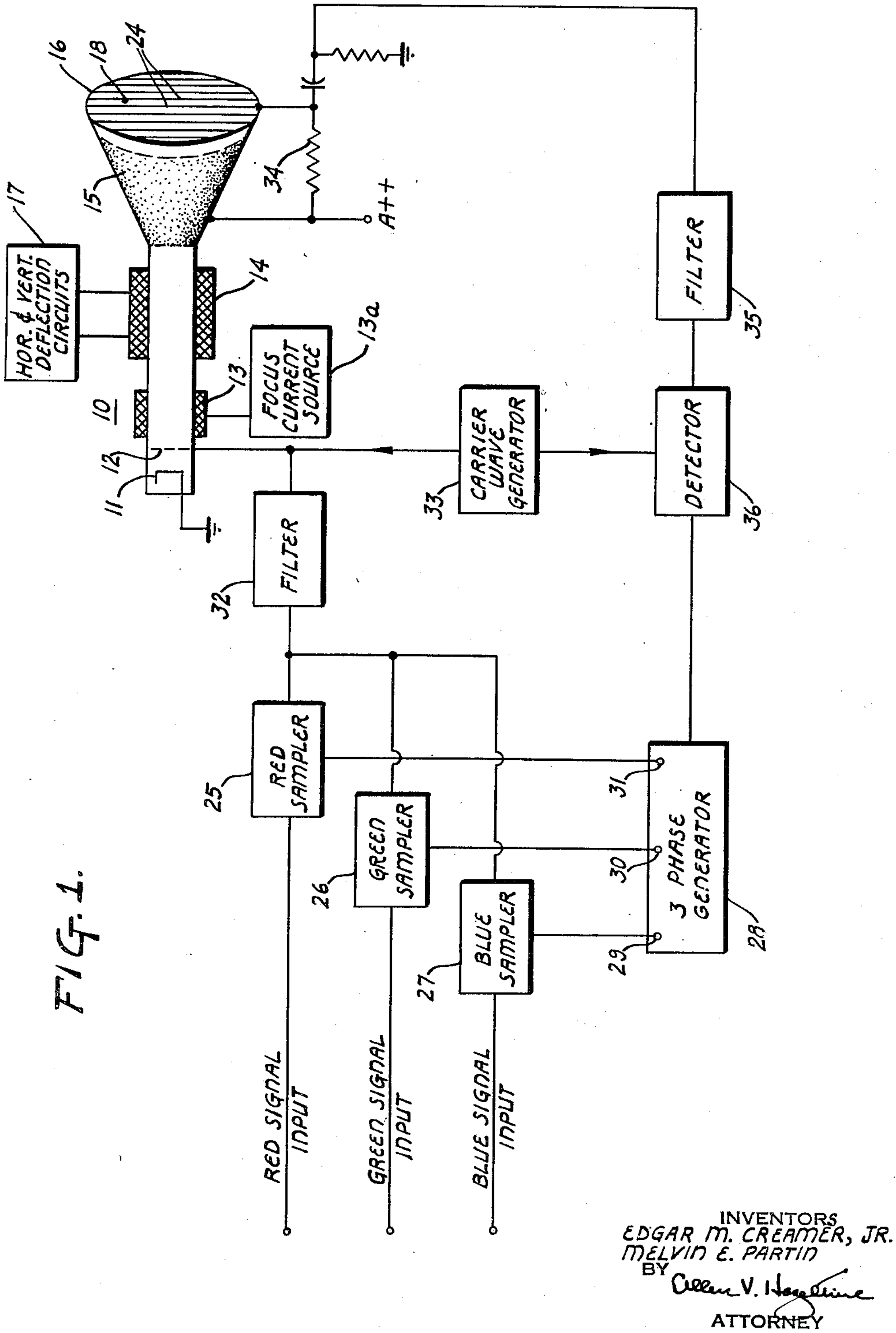
Figure 1 illustrates a fundamental form which systems embodying our invention may take.

Referring now to Figure 1, the embodiment of the invention shown therein comprises a cathode ray tube 10 which is equipped with a conventional cathode 11, beam intensity control grid 12, focus coil 13, horizontal and vertical deflection coils 14 and an accelerating anode 15 which consists of a conductive coating on the inner wall of the envelope and which terminates at a point spaced from the face plate 16 of the tube in conformance with well established practice. First anode 13 is connected to a suitable source of focusing current 13*a*, while accelerating anode 15 is supplied from a suitable source of positive potential A++. Deflection coils 14 are supplied with conventional horizontal and vertical deflection signals, respectively, from horizontal and vertical deflection circuits 17. The elements of tube 10 hereinbefore listed are all entirely conventional, as are the power supply and deflection circuits connected therewith, so that no further discussion thereof is required.

The face plate 16 of the tube is provided with a beam intercepting structure 18 shown in detail in Figure 2. In the arrangement shown in Figure 2, the structure 18 is formed directly on the face plate 16. However, it should be well understood that the structure 18 may be formed on a suitable light transparent base which is independent of the face plate 16 and may be spaced therefrom. In the arrangement illustrated, the face plate 16, which in practice consists of glass having preferably substantially uniform transmission characteristics for the various colors in the visible spectrum, is provided with a plurality of elongated parallelly arranged groups of stripes 19, 20 and 21 of phosphor material which, upon impingement by the cathode ray beam, fluoresce to produce light of three different primary colors. For example, the stripes 19 may consist of a phosphor which, upon excitation, produces red light, the stripes 20 may consist of a phosphor which produces green light and the stripes 21 may consist of a phosphor which produces blue light. Each of the groups of stripes may be termed a color triplet and, as will be noted, the sequence of the stripes is repeated in consecutive order over the area of the structure 18. Suitable materials constituting the phosphor stripes 19, 20 and 21 are well known to those skilled in the art, as well as the method of applying the same to the face plate 16 and further details concerning the same are believed to be unnecessary.

The beam intercepting structure 18 further comprises a thin, electron permeable conducting layer 22 which is arranged on the phosphor stripes 19, 20 and 21 and which preferably further constitutes a mirror for reflecting light generated at the phosphor stripes toward face plate 16. In practice the layer 22 is a light reflecting aluminum coating which is formed in a well known manner. It should be well understood, however, that other metals having similar characteristic properties may also be used. Such other metals are, for example, magnesium or beryllium.

Arranged over one of the phosphor stripes of each of the color triplets (for example over each of the green phosphor stripes 20) is an indexing stripe 23 consisting of a material having a secondary emission ratio detectably different from that of the material of coating 22. Each stripe 23 may consist of a metal of high atomic number, such as gold, or of a mixture containing magnesium oxide as previously pointed out.

It should be kept in mind that the screen structure of Figure 2 is shown as it would appear viewed from the interior of the cathode ray tube. When so viewed, the electron beam of the tube will ordinarily scan the screen from right to left, thereby impinging consecutive color stripes in the order green, red, blue.

Note further that the portion of screen structure 18 which is shown in Figure 2 is considerably enlarged so as to facilitate the detailed description of its construction. Since the space available for the illustration of this screen structure in Figure 1 is entirely inadequate to permit its detailed representation, it has, instead, been diagrammatically represented by vertical lines 24 drawn on face plate 16. Whenever, in the subsequent discussion, it is necessary to refer to the details of construction of this screen structure 18, reference will, therefore, be had to Figure 2.

The accelerating anode 15, in addition to performing the usual electron beam accelerating function, also functions to collect secondary electrons emitted by screen structure 18 in response to impingement by the electron beam. The secondary electron emission circuit associated with the screen structure is closed by output resistor 34 which interconnects anode 15 and screen structure 18.

By way of this secondary electron emission circuit, there are derived, from the screen structure, signals indicative of beam impingement upon indexing stripes 23. The manner of derivation of these signals is novel and is therefore fully set forth hereinafter. The manner of utilization of these signals, on the other hand, is conventional and will therefore be briefly reviewed so as to complete the groundwork on which to base a complete understanding of our inventive concept.

As is frequently the case in color television receiver systems, the system illustrated in Figure 1 is supplied with three separate received signals, respectively indicative of the red, green and blue components of the televised scene, which signals preferably have had their D.-C. components restored and are of such polarity that the more positive portions thereof correspond to darker regions of the television image. These different signals are next recurrently sampled, in a predetermined order, so as to form a single signal, whose amplitude is, at time-spaced intervals, representative of intelligence respecting different ones of the three primary color components of the televised scene. This single signal is then applied to cathode ray tube grid 12 where it controls the beam intensity. It is desired to have the sampling operation occur at such intervals that the resultant single signal will be representative of intelligence respecting a particular color at the exact time when the electron beam is impingent upon a stripe emissive of light of that same color. To achieve this result, it has been proposed to control the sampling operation by means of the signals derived from the indexing stripes, for these signals are indicative of the actual time of such impingement.

In the embodiment selected for illustration in Figure 1, the sampling operation is carried out by three sampling circuits, 25, 26 and 27 to which the three received color signals are respectively supplied. Sampling circuits of the type here contemplated are well known in the art and each one may, for example, consist of a conventional pentode vacuum tube, to one of whose control grid electrodes the received video signal is continuously applied, while its other control grid electrode is normally biased so far negatively as to prevent space current from reaching the anode. These other electrodes of the pentode sampling tubes are now supplied, in the proper sequence, with positive gating signals of sufficient magnitude to overcome their negative bias and to permit conduction of the tubes. In the present arrangement, these gating signals are derived from a three phase generator 28, having three output terminals 29, 30 and 31 at which gating signals differing mutually in phase by 120° appear respectively. The nominal frequency at which the sampling operation is carried out is preferably coordinated with the rate of beam sweep traversal across color stripes of the cathode ray tube screen structure. A typical nominal value of sampling frequency is 7 megacycles for each color signal. The instantaneous sampling frequency will, of course, be directly controlled by the signals which are derived from the indexing stripes of the tube screen for this very purpose.

It has been found advantageous to deal with the sampled color signals at the lowest possible frequency. For this reason, the output signals of the red, green and blue samplers are not applied directly to the control grid electrode 12 of the cathode ray tube but are instead passed through a common low-pass filter 32 whose frequency response is such that it will transmit only signals in the 0 to 7 megacycle frequency range. Thus, instead of a series of discontinuous signals, there will be supplied, to control grid electrode 12, a smoothly varying 7 megacycle signal whose amplitude is the same as the amplitudes of the individual sampled signals would have been at their sampling intervals. Consequently, the beam intensity will be controlled smoothly and continuously, and yet accurately in accordance with color information instead of being subject to the undesired transient effects of discontinuous modulation.

Assuming that the component color input signals supplied to the samplers 25, 26 and 27 were produced by a predetermined systematic scanning operation, so that at successive instants their values are representative of the colors of different elements of a televised image, and that the horizontal and vertical deflection circuits 17 are designed and controlled so as to reproduce that scanning process, then a corresponding color image will be reproduced on the beam intercepting structure 18 of tube 10.

It will be understood that, instead of sampling each received signal with pulse-like signals occurring at the proper times, it is possible to produce a single signal of the desired time-sequential form by forming three sinusoidal signals, as by generator 28, having the same mutual phase relationships as the different sampling signals hereinbefore described, and then modulating the signal in each color channel with the appropriately phased one of these sinusoidal signals.

For the purpose of producing the aforementioned indexing signals, the system of Figure 1 is, according to the invention, further provided with a carrier wave generator 33, a secondary electron emission output circuit which includes the cathode ray screen structure, its accelerating anode and output resistor 34, a filter 35 and a detector 36.

In the operation of the cathode ray tube system thus far described, the cathode ray beam, in its vertical and horizontal travel across the beam intercepting structure 18 (see Figure 2), impinges successively on the coating 22 and the indexing stripes 23, causing a secondary emission current to flow through output resistor 34. This current is relatively small when the beam is impingent upon the coating 22 but increases substantially when the beam impinges upon an indexing stripe 23. Thus, the current flowing through output resistor 34 will fluctuate, during scanning of the screen structure by the electron beam, in proportion to variations in secondary electron emission therefrom as the beam traverses alternate regions of low and high secondary electron emissivity.

As the beam thus scans across the screen structure, its intensity is modulated in accordance with color information by the color signal applied to control grid 12 in the manner hereinbefore explained.

This variation of beam intensity will, of course, also produce variations in secondary emission from the screen structure. As a result, the variations in current flowing through output resistor 34 will also be proportional to the variations in this signal voltage. It is in this manner that the indexing signal produced in output resistor 34 by the passage of the beam across successive indexing stripes and intervening regions of low secondary electron emissivity is contaminated with video signal variations, as hereinbefore indicated.

In accordance with the invention, there is supplied to the control grid electrode 12 of cathode ray tube 10, in addition to any video or noise voltages which may appear thereon, an independently generated carrier wave voltage produced by generator 33. This generator may take any conventional form provided only that it be proportioned so as to operate stably at a substantially constant frequency. An electron-coupled Hartley oscillator has been successfully used in actual embodiments. This generator is so constructed as to produce a carrier wave voltage having a frequency substantially outside the range of frequencies occupied by the video signal. In the present illustrative case, this video signal has been assumed to occupy a frequency range of from 0 to 7 megacycles. In that event, the carrier wave frequency may be chosen to be 38.5 megacycles, it being understood that this is a figure selected from considerations of practical convenience. Any other frequency substantially higher than the highest video frequency will be appropriate for the same purpose.

It will now be apparent that this carrier wave voltage will also produce corresponding variations in the emission of secondary electrons from screen structure 18 and, since this carrier wave voltage is applied continuously to the control grid electrode, these variations will also be subject to the superimposed variations due to changes in the secondary electron emission from the screen structure as the electron beam passes across alternate regions of low and high emissivity. Thus there will appear across output resistor 34 a voltage component which is proportional not only to the carrier wave voltage but also to variations in secondary emission from the screen structure produced by electron beam scanning thereof. In other words, there will appear across output resistor 34, a voltage component of carrier wave frequency, which is amplitude modulated at the rate at which the electron beam sweeps across indexing elements of the screen structure.

As was explained in the course of the description of Figure 2, the indexing stripes 23 are preferably disposed at every third color stripe, or in the present case, at every successive stripe emissive of green light. By virtue of the particular rate at which the sampling of the received color signals is carried out, information respecting the green color signal will be recurrent in the video signal applied to beam intensity control grid 12 at a 7 megacycle rate. Therefore the horizontal and vertical deflection circuits will be so preadjusted as to produce beam deflection across successive green light emissive color stripes at a nominal rate of 7 megacycles. As a result, the rate of beam traversal of indexing stripes superimposed on these green color stripes will also be 7 megacycles, on the average and this will, furthermore, be the nominal frequency of the signal produced in output resistor 34 by such indexing stripe traversal. This 7 megacycle indexing signal will however vary in instantaneous frequency because of non-linearities in the deflection circuits which cause the rate of beam traversal across consecutive indexing stripes to depart from the desired 7 megacycle rate in an unpredictable manner and also because of virtually unavoidable inequalites in indexing element spacing which occur when working with the close tolerances required in the construction of the screen structure 18. It has been found practical, however, to limit departures from the nominal 7 megacycle frequency of the indexing signal variations to a range of not more than 10% on either side of this nominal rate. Thus the rate of variation of the output signal across output resistor 34 due to scanning of the beam across indexing elements can reliably be expected to be somewhere in the frequency range of 6.3 megacycles to 7.7 megacycles. As a result, there will be a component of output voltage, produced by interaction between variations proportional to carrier wave voltage variations and variations proportional to index signal variations, which will occupy a frequency range centered about the difference between 38.5 megacycles and 7 megacycles, or 31.5 megacycles, and extending 0.7 megacycle on either side of this center value. Furthermore, if the electron gun characteristic is linear, there will be in this frequency range no component of output voltage due to video signal variations.

Filter 35, of any conventional design suitable for the purpose, is connected to output resistor 34, this filter being so proportioned as to transmit only signal components in the aforesaid frequency range of 31.5 megacycles plus or minus 0.7 megacycle to the substantial exclusion of all other signal components. There then appears, at the output of filter 35, a single modulation component produced only by interaction between the 38.5 megacycle carrier wave voltage and the voltage variations due to scanning of the beam across indexing stripes of the screen structure. This output is then supplied to detector 36 which is operative to select from this modulated signal, only the low frequency modulation envelope which, as has been seen, corresponds to the signal variations produced by changes in secondary emission from the screen structure 18 as the electron beam traverses consecutive indexing stripes 23. One convenient way in which this may be accomplished is by supplying to detector 36, not only the modulation component transmitted by filter 35, but also the signal produced by carrier wave generator 33, and arranging detector 36 to heterodyne these two supplied signals and to select, for further transmission to its output circuit, the low frequency heterodyne component corresponding to the aforedescribed signal variations produced by the indexing stripes. By virtue of its time and rate of occurrence, this signal thus provides an indication of the time and rate at which the electron beam of the cathode ray tube is impingent upon an indexing element 23 of the screen structure. Similarly it provides an indication of the time when the electron beam is impingent upon the green light emissive phosphor stripe which lies directly beneath each indexing stripe. Furthermore, assuming reasonably accurate maintenance of spacing between colored light emissive phosphor stripes in each triplet, the occurrence of the indexing signal may also be taken as an indication of the time of beam impingement upon the following two phosphor stripes of the triplet, inasmuch as such impingement will take place at fixedly time-spaced intervals from the occurrence of the indexing signal.

Before proceeding, it may be pointed out that the aforedescribed heterodyne process is not the only one by which the pure indexing signal may be derived from the screen structure of the tube. Alternatively, filter 35 may be modified so as to transmit not only the single 31.5 mc. difference frequency component produced by interaction between carrier wave signal and variations due to the screen structure, but also the sum frequency component at 45.5 megacycles and the carrier wave component at 38.5 megacycles. In that event, heterodyne detection of the indexing signal is not required. Instead, detector 36 may simply be a conventional amplitude-modulation detector of any well known type arranged so as to detect the relatively low frequency 7 megacycle modulation component due to the indexing elements of the screen structure.

In any event, it is the output of this detector which is applied to three phase generator 28 to control the rate of gating signal production of the latter. In the present arrangement, the three phase generator 28 may be so arranged that a gating signal which is in phase with the indexing signal supplied to the generator will appear at output terminal 30 and will therefore be supplied to green sampler 26 so that a signal indicative of green video information will be applied to the beam intensity control grid electrode 12 of cathode ray tube 10 at the time when the cathode ray beam is impingent on a green light emissive phosphor stripe of the screen structure 18.

A variety of arrangements are known which will serve in the capacity of three phase generator 28. One such may comprise an automatically variable delay line with three output taps so spaced that signals applied to its input appear at the different taps in the aforementioned 0°, 120° and 240° phase relation irrespective of the frequency of the input signals. As indicated in the discussion of Figure 2, the beam, in its traversal of the screen structure, will next impinge upon a red light emissive color stripe. Furthermore, since the phosphor stripes are approximately equally spaced, this impingement will occur approximately one third of the way through the interval between consecutive indexing signals. Accordingly, three phase generator 28 is constructed so as to produce an output signal at terminal 31 at a time which is later than that at which it produces a signal at terminal 30 by one-third the interval between successive indexing pulses. In other words, the output signal at terminal 31 will lag by 120 degrees the output signal at terminal 30. This signal is then applied to red sampler 25 where it serves to gate on the sampling tube, thereby permitting a signal indicative of red color information to appear at the grid 12 at the time when the cathode ray beam is impingent upon a red phosphor stripe of the screen structure. Continuing its progress across the screen structure, the electron beam will next impinge upon a blue light emissive phosphor stripe and this will occur two-thirds of the way through the interval between two consecutive indexing signals. Therefore blue sampler 27 must be actuated at that particular time and for this reason three phase generator 28 is adapted to produce an output signal at terminal 29 which is delayed by 240 degrees in phase with respect to the output signal at terminal 30, which latter, in turn, is in phase with the indexing signal.

Thus, it is seen that each indexing signal initiates the production by three phase generator 28 of three consecutive output signals occurring in order at terminals 30, 31 and 29 and differing mutually in phase by 120 degrees. Any change in either the spacing of the phosphor stripes across the screen structure or in the linearity of beam deflection will then be accompanied by a change in the time and rate of occurrence of the indexing signals and this will in turn produce an appropriate change in the output of three phase generator 28 which will insure that the sampling circuits are activated at the proper times so that a signal representative of a desired color will appear at the beam intensity control grid electrode 12 at the time when the cathode ray beam is impingent upon a phosphor stripe emissive of that color.

Although in the embodiment of Figure 1, as well as in those to follow, the indexing signal is derived from the screen structure by relying on differences in secondary emissivity between different portions of the screen, it will be understood that this is by no means the only way of deriving such indexing signals. A well known alternative, for example, resides in disposing a photoelectric cell in screen confronting relationship and equipping the same with a filter transmissive of light from only one type of color stripe. Such a system is subject to all the aforementioned shortcomings of the secondary emission system and its indexing signal is susceptible to the same remedial measures.

Observe now that, in the arrangement of Figure 1, the indexing signal derived from screen structure 18 passes, in succession, through index output resistor 34, filter 35 and detector 36, after which it is utilized to trigger three phase generator 28 whose output signals, in turn, sample the red, green and blue signal information so as to produce a single signal which is, at recurrent time intervals, representative of intelligence respecting the three different primary colors. As has been pointed out hereinbefore, the entire purpose of this system is to insure that the intervals at which this signal is representative of such color intelligence will occur exactly when the beam is impingent upon corresponding colored light emissive phosphor stripes. It is apparent that, the greater the number of components through which the indexing signal must pass and the greater the number of operations performed thereupon or which are dependent thereon for their initiation, the less likely it will be that this coincidence will actually be maintained. For, while it is ordinarily assumed that the passage of a signal through various circuit components is substantially instantaneous, nevertheless it is recognized that under conditions where extreme accuracy must be maintained, the transient or response time of such components may assume disturbing proportions. In the case under consideration, for example, the response of the three phase generator 28 to an applied indexing signal may not be as rapid as desired, with the result that the sampling of the color input signals may occur a trifle later than the times indicated by the occurrence of the indexing signal. Obviously, the result of this would be that the beam intensity would not correspond exactly to color information at the time when the beam is impingent upon colored light emissive phosphor stripes so that color distortion of the image formed on the screen structure will result. It is therefore desirable to have the indexing signal and all signals derived therefrom or initiated thereby traverse the least possible number of circuit components prior to its actual control of the rate of occurrence of intelligence representative intervals in the video signal as finally applied to the beam intensity control grid electrode of the cathode ray tube.

A system embodying our invention and which is considerably superior to that of Figure 1 in this respect is illustrated in Figure 3, to which more detailed reference may now be had. Note, first of all, that important portions of the system of Figure 3 are identical with certain portions of that of Figure 1. Similar elements of the two systems have, therefore, been designated by similar reference numerals. Thus the system of Figure 2, like that of Figure 1, is provided with a cathode ray tube 10 having cathode 11, beam intensity control grid 12, focus coil 13, deflection circuits 14, accelerating anode 15, face plate 16, and a screen structure 18 which may be identical, in every respect, with that of Figure 2, so that no detailed description of this screen structure is required. Conventional power supply and deflection circuits are again provided for cathode ray tube 10, these including horizontal and vertical deflection circuits 17 and sources of focus current and accelerating anode potential. The secondary emission circuit of the screen structure is again, as in Figure 1, closed by an output resistor 34 connected between the screen structure 18 and the accelerating anode 15. The beam intensity control grid 12 is supplied with video signals, derived in a manner hereinafter explained in detail and is also supplied with a carrier wave signal voltage produced by carrier wave oscillator 33 which is similar to the similarly numbered oscillator of Figure 1. As was the case in Figure 1, these simultaneously applied video signals and carrier wave signals interact with variations in secondary emission produced by sweeping of the beam across alternate regions of high and low secondary emission ratio to produce signal voltage components across index output resistor 34 which are the result of modulation of the video signal by variations in secondary emission due to the indexing structure, as well as other signal components which are the result of modulation of the carrier wave in accordance with secondary emission variations produced by the indexing structure. Assuming again, as was the case in the system of Figure 1, a maximum video modulation frequency of 7 megacycles and an indexing structure so proportioned as to produce a 7 megacycle modulation due to beam traversal of the indexing structure alone, the modulation components produced by index modulation of the carrier wave voltage will again be at a substantially different frequency from those produced by indexing signal modulation of the video signals.

Just as was done in the system of Figure 1, these amplitude modulated carrier wave components, or better yet a single heterodyne component produced by interaction between the indexing signals and the carrier wave signal voltage, are separated from all other signal components appearing across output resistor 34 by means of filter 35, the thus separated components being supplied to one of the input circuits of a mixer 37. But whereas, in accordance with the method employed in the system of Figure 1, a signal derived directly from carrier wave oscillator 33 would now be supplied to the second input circuit of mixer 37 for heterodyning with the indexing signal component selected by filter 35 to produce a signal representative of indexing information alone, in this arrangement the signal to be applied to the second input circuit of mixer 37 is derived in a different manner. Specifically, the carrier wave oscillator output signal is supplied, simultaneously with its application to beam intensity control grid 12, to a three phase signal generator 38 which is similar to three phase generator 28 of Figure 1 except that it is constructed so as to produce gating signals at each of its output terminals 39, 40 and 41 at a rate determined by the frequency of the carrier wave oscillator signal voltage. Note that it is now possible to use a simple constant delay device as the three phase generator since the input signals supplied thereto are always of the same frequency. Assuming the same values as in the example of Figure 1, where the carrier wave oscillator operated at a frequency of 38.5 megacycles, signals mutually differing in phase and each recurrent at a 38.5 megacycle rate will then appear at three phase generator terminals 39, 40 and 41. These signals are now used to activate, respectively, the red, green and blue signal sampler 25, 26 and 27 which may be substantially similar in construction to the similarly numbered samplers of Figure 1. The output signals of the three samplers are then additively combined and supplied to a filter 42 which is arranged to transmit a band of frequencies whose width is equal to the maximum range of any one of the individual color input signals prior to sampling and which is centered about 38.5 megacycles. Thus there will appear, at the output of filter 42, a 38.5 megacycle carrier signal modulated in amplitude and phase in accordance with the time-multiplexed red, green and blue color signals.

It is this signal, transmitted by filter 42, which is supplied to the second input circuit of a conventional mixer 37 where it is heterodyned with the output signal of filter 27. Since this latter is at a nominal frequency of 31.5 megacycles, as has been indicated, the resultant output of mixer 37 will be a 7 megacycle signal modulated in accordance with the variations due to the time-multiplexed red, green and blue signals. A filter 43 may be provided to select the low frequency sidebands of the output of mixer 37, and the output of this filter is then suitable for application to the beam intensity control grid 12 of cathode ray tube 10, being representative of color information at three properly time-spaced intervals during each cycle of the 7 megacycle indexing signal, as required for faithful color reproduction.

It has been found that while, in systems such as those shown in both Figures 1 and 3, indexing impurities due to video modulation at the screen structure are substantially eliminated, nevertheless some contamination of the indexing signal may be produced by interaction between the video signal voltage and the carrier wave signal voltage at the cathode and control grid electrode of the cathode ray tube unless certain precautions are taken. Such interaction is due to non-linearity in the grid control circuit and will produce spurious signal components at the difference frequency between the two applied signals. These, in turn, will be reproduced in the index signal output circuit. Since these spurious components are then at the same frequency as the components which it is desired to derive from this same indexing output circuit, they will not be rejected by subsequent frequency selective networks like filter 35 and may therefore succeed in contaminating the final indexing signal.

To overcome this difficulty, there is inserted in the cathode circuit of the cathode ray tube a resistor 44, across which portions of the aforedescribed spurious components will be developed. The voltages so produced across resistor 44 are then amplified in cancellation amplifier 45 which is a conventional vacuum tube amplifier arranged to transmit only the aforesaid spurious components with such gain that subsequent application thereof with appropriate phase to resistor 46, located in the index signal output circuit, will just cancel those spurious components which appear in this index output circuit as a result of the aforedescribed phenomenon.

For further details of the treatment of this phenomenon by means of signal cancellation, reference may be had to the copending U. S. patent application of William E. Bradley, Serial Number 203,175, filed December 28, 1950, and assigned to the assignee of the present invention. Alternatively, two separate cathode ray guns may be employed within the same cathode ray tube envelope, one of them producing a beam which is modulated in intensity by the carrier wave signal voltage exclusively, while the other one is modulated only by the video signal. In that event, of course, there will be no interaction between the two signals at the electron gun and the aforedescribed cancellation circuit will not be required. This expedient constitutes a separate invention which is fully described and claimed in copending application Serial No. 242,264, filed August 17, 1951, of Melvin E. Partin which is likewise assigned to the assignee of the present invention.

Note, further, that non-linearities in the cathode ray tube gun structure may produce beam intensity modulation at harmonics of the video signal applied to the control grid. The carrier wave frequency is therefore preferably chosen so that neither it, nor the frequencies of signals resulting from index modulation thereof are at harmonics of the video signal. This is the principal consideration which prompted the particular choice of carrier wave frequency in the present case, as 38.5 megacycles is midway between two harmonic frequencies of the 7 megacycle video signal and so are its index modulated sidebands at 31.5 and 45.5 megacycles.

In the systems illustrated in both Figures 1 and 3, the red, green and blue color signals initially applied to the systems have been assumed to be of the form of signals produced, for example, by three simultaneously scanning television cameras, equipped with red, green and blue light transmissive filters, respectively, and all viewing the same scene. Signals of this type are, of course, directly available in laboratory equipment and may also be readily provided in closed circuit commercial equipment. When, however, the originally produced camera signals are to be transmitted to distant receivers by means of broadcasting facilities, there is ordinarily not sufficient spectrum bandwidth available to be able to transmit these three signals simultaneously in their original form. Consequently, expedients have been devised for modifying these signals at the transmitter so as to conserve bandwidth while retaining all useful intelligence content. While it is, of course, always possible to reconstitute red, green and blue signals at the receiver which are of the same form as those produced by the cameras, thereby providing color input signals of the type required for application to the system of either Figures 1 or 3, it will ordinarily be advantageous, from the point of view of equipment economy, to utilize the received signals as nearly as feasible in their actual received form. It behooves, therefore, to examine the applicability of our inventive concept to presently proposed systems for the reception and utilization of color television signals to which certain bandwidth economy techniques have been applied.

The technique for effecting such bandwidth economy which has received the most favorable notice up to the present time is one in which the aforesaid three separately produced color signals are sampled at the transmitter at some rapid rate, such as, for example, 3.5 megacycles. By then additively combining the sampled signals and passing them through a low pass filter adapted to transmit, for example, signal components in the range from 0 to 4 megacycles, there is produced, at the output of the filter, a composite signal having a slowly varying component which corresponds to the average brightness of the televised scene and which occupies the 0 to 3 megacycle frequency range, upon which there is superimposed a high frequency color component of 3.5 megacycle nominal frequency. This color component is phase and amplitude modulated in accordance with color information so that its sidebands occupy the 3 to 4 megacycle range. Let it be understood, in this connection, that the particular method by which a signal of the general type hereinbefore set forth is produced at the transmitter is immaterial, our only concern being with the form of these signals as they appear at the receiver.

In the copending U. S. application of Robert C. Moore, Serial No. 214,995, filed March 10, 1951, and assigned to the assignee of the present invention, there is set forth in detail a television receiver system adapted to be supplied with video signals having the general form hereinbefore outlined. This system utilizes indexing signals derived from the screen structure of the receiver cathode ray tube for the purpose of modifying the rate of occurrence of intervals during which the received signal is representative of different component color information, so that these intervals are caused to coincide with intervals during which the cathode ray beam is impingent upon screen elements emissive of light of the proper color. The manner in which our inventive concept may be directly applied, with highly beneficial effects, to a system of the type disclosed in the last-named copending application will now be described with particular reference to Figure 4 of the drawings. There is shown, in Figure 4, a cathode ray tube 10 identical with the similarly designated cathode ray tube of Figures 1 and 3, in that it too comprises a cathode 11, control grid electrode 12, focus coil 13, horizontal and vertical deflection circuits 14, accelerating anode 15, face plate 16 and screen structure 18. Like the cathode ray tubes of Figures 1 and 3, it is also connected to suitable sources of focus current 13*a* and accelerating anode potential A++, as well as to conventional horizontal and vertical deflection circuits 17. The secondary emission circuit of screen structure 18 is again closed by a resistor 34 interconnecting the accelerating anode and the screen structure. A filter 35, substantially identical with those similarly designated filters in Figures 1 and 3 is connected to receive the signal developed across output resistor 34. A 38.5 megacycle carrier wave signal is produced by carrier wave oscillator 33 and is applied to control grid electrode 12 of cathode ray tube 10 by way of an adding circuit 47 in which it is additively combined with other signal components to be described in more detail hereinafter. As in each of the previously described embodiments, this carrier wave signal produces corresponding variations in the potential across output resistor 34, these variations being modulated at the rate of traversal of indexing stripes in the screen structure 18 by the electron beam as the latter is deflected across the screen structure. Thus there will again appear heterodyne components produced by this modulation across output resistor 34, filter 35 being, as usual, arranged to derive therefrom the difference frequency heterodyne component. Assuming again that the indexing stripes of the screen structure are so spaced in relation to the speed of beam traversal due to deflection thereof across the screen structure as to produce a modulation of the carrier wave at the rate of 7 megacycles, then this difference frequency component selected by filter 35 will again be at a nominal 31.5 megacycle frequency. Before considering the path followed by this modulation component through the remainder of the system, it will be necessary to consider the composition and treatment of the video signal in more detail. The entire received video signal will appear at the output of a video signal source 48 where there will be available the 0 to 3 megacycle brightness signal, the 3 to 4 megacycle color signal, as well as conventional blanking and synchronizing signals interspersed therewith in the usual manner. Note, in this connection, that the color signal alone provides no indication of the actual times of occurrence of the intervals during each cycle of this color signal at which its amplitude is actually representative of color information. Consequently, it is common practice to provide intermittently recurrent oscillatory signal bursts of short duration having the same nominal frequency as that of color signal and having a phase, with reference to the phase of the color signal, which is indicative of the actual times of occurrence of color representative intervals in the latter. In order to make these oscillatory signal bursts, which are called color synchronizing bursts, readily distinguishable from the actual color signal, they are frequently superimposed on the trailing portion of the horizontal blanking pulses, whose leading portion is, of course, occupied by the conventional line synchronizing pulse. As in the system disclosed in Figure 1 of the aforementioned copending application of Robert C. Moore, the video signals appearing at the output of video signal source 48, and having the aforedescribed characteristics, are divided among three separate signal channels in the following manner. The low frequency or brightness components of the composite signal are separated from the remainder of the signal by a low pass filter 49 which is transmissive of signal components in the 0 to 3 megacycle range to the substantial exclusion of signals of all other frequencies. The high frequency color component of the composite signal is separated from all other components by means of a high pass filter 50 arranged to transmit only signals above three megacycles in frequency. Finally, the color synchronizing bursts are separated from the remainder of the composite signal by first applying this composite signal to a blanking pulse gating circuit 51 which is amplitude discriminatory to transmit only signals superimposed on the blanking pulse. Thus this gating circuit will transmit only the horizontal synchronizing pulses and the color synchronizing bursts, these being the only signals whose amplitude level exceeds that of the blanking pulses. The output of this blanking pulse gating circuit is then supplied to a color burst separator 52 which may simply consist of a filter adapted to pass signals of 3.5 megacycle frequency to the substantial exclusion of all others, thereby rejecting the horizontal synchronizing pulses which occur at a much lower rate, namely 15.75 kilocycles according to present-day television standards. The color synchronizing bursts, which will now appear at intervals of one horizontal scanning line in the output of color burst separator 52, are next utilized to operate a cohered oscillator 53 which produces a continuous signal, also of 3.5 megacycle frequency and having the same phase characteristics as the color synchronizing bursts.

There are thus available, in three separate channels, the separated low frequency brightness component, the high frequency color component, and a continuous signal having the phase characteristics of the color synchronizing bursts. Reference to the above-mentioned copending application of Robert C. Moore will show that the treatment of the video signals has, up to this point, been exactly the same in the present arrangement as in that of Figure 1 of the above-mentioned copending application. In the latter arrangement, the continuous signal produced by the counterpart of cohered oscillator 53 was heterodyned with an indexing signal derived from the tube screen structure, after which one of the heterodyne components produced was heterodyned with the high frequency color component to produce a final output signal of index frequency which had all the phase and amplitude information of the original color signal in the form of corresponding phase and amplitude modulation. The final output signal thus produced was then representative of color information at discrete intervals which, however, recurred not at the rate determined by the received signal but instead at the rate and at times determined by the indexing signal. In the present arrangement the signal appearing at the output of filter 35, unlike that produced in the Moore embodiment, is not of a frequency determined solely by the physical arrangement of the indexing stripes in the cathode ray tube and the rate at which the electron beam traverses them, but is further dependent on the frequency of the carrier wave from oscillator 33 which is supplied to the grid of the cathode ray tube 10 together with the video signal. However, this signal contains indexing information in the form of a heterodyne between a signal representative of such information and the aforementioned carrier wave signal and it may therefore be supplied to mixer 54 along with the output from cohered oscillator 53 in a manner and for a purpose similar to that of Moore. There is then selected, from the output of mixer 54, one heterodyne component produced in response to the aforesaid input signals. Preferably, this will be the sum frequency component or, under the present illustrative conditions, the 35 megacycle component. This frequency selection will ordinarily take place in the conventional tuned output circuit of the mixer 54. However if this circuit proves not to be sufficiently sharply frequency discriminatory, additional filters may be provided as required. This 35 megacycle heterodyne output component of mixer 54 is next supplied to another mixer 55. This latter is preferably of the balanced type characterized in that only heterodyne components produced by the mixer appear in its output circuits while components of the input signal frequency proper are suppressed. Balanced mixer 55 is simultaneously supplied with the high frequency color signal derived from high pass filter 50. These two input signals are heterodyned by the mixer and from its output there is selected the difference frequency heterodyne component or, in other words, a signal of 31.5 megacycle nominal frequency which is now phase and amplitude modulated in proportion to the phase and amplitude modulation of the high frequency color signal so as to produce modulation sidebands extending over a 0.5 megacycle range on either side of the aforesaid nominal frequency. This output signal of balanced mixer 55 is next supplied to still another mixer 56 where it is heterodyned with a signal derived directly from carrier wave oscillator 33, there being provided, in the output circuit of mixer 56, a band-pass filter 57 which is arranged to select, from among the output components of mixer 56, the difference frequency component which lies in the 7 plus or minus 0.5 megacycle frequency range.

Thus, there appears at the output of band-pass filter 57 a signal of the nominal frequency of the signal produced by the indexing stripes of the screen structure of the cathode ray tube 10 but bearing the same phase and amplitude information as the received high frequency color signal. Consequently, there will be three intervals during each cycle of this 7 megacycle signal at which the signal will be representative of color information. Thus, whereas the received color signal was representative of color information three times during each 3.5 megacycle signal cycle, the modified color signal will be representative of color information 3 times during each 7 megacycle signal cycle. Variations in this nominal 7 megacycle rate will occur because of departures in the indexing signal from its ideal 7 megacycle rate brought about by non-linearity of the sweep trace or inequality of color stripe spacing. In spite of such variations, the color signal produced by bandpass filter 57 will be precisely right for application to control grid electrode 12 where it will serve to produce a beam intensity corresponding to the proper color information at the very interval when the beam is impingent upon a phosphor stripe emissive of that particular color. This particular topic is treated at length in the aforementioned copending application of Robert C. Moore where a substantially identical modified high frequency color signal is finally produced. Again, as in the aforementioned copending application, this color signal is now additively combined with the low frequency brightness signal derived from low pass filter 49, this being accomplished in adding circuit 47 where, as previously indicated, there is also added the carrier wave signal voltage produced by oscillator 33. The recombined low frequency, high frequency color and carrier wave signals are then utilized to control the beam intensity by means of control grid 12.

Thus it is seen that our inventive concept is readily applicable to systems in which the applied signal is exactly of the form in which it may normally be expected to arrive from a broadcasting station. Naturally, numerous modifications of the systems hereinbefore illustrated will occur to those skilled in the art without departing from the scope of our inventive concept. Therefore, we desire the latter to be limited only by the appended claims.

We claim:

1. In a cathode ray tube system: a cathode ray tube comprising a source of an electron beam and a beam interceptive structure including a fluorescent screen structure and also having first and second portions, said portions being responsive to beam impingement to produce outputs which vary in response to variations in beam intensity, the relationship between said outputs and the intensity of said beam being different for said first and second portions; means for deflecting said beam to impinge said beam successively upon said first and second portions of said beam interceptive structure; a source of an image signal comprising components within a predetermined frequency range; means responsive to said image signal to modulate the intensity of said beam to control the light emission from said fluorescent screen structure, said modulation also producing variations in the outputs of said portions comprising frequency components within said range; means for modulating the intensity of said beam at a frequency external to said range, said last-named modulation and the successive impingements of said beam upon said first and second portions cooperating to produce variations in said outputs comprising frequency components external to said range; and means for deriving from said outputs a signal representative solely of variations in said outputs comprising frequency components external to said range.

2. In a cathode ray tube system: a cathode ray tube comprising a source of an electron beam and a beam interceptive structure having first and second portions, said portions being responsive to beam impingement to produce outputs which vary in response to variations in beam intensity, the relationship between said outputs and the intensity of said beam being different for said first and second portions; means for deflecting said beam to impinge said beam successively upon said first and second portions of said beam interceptive structure; a source of an image signal comprising components within a predetermined frequency range; means responsive to said image signal to modulate the intensity of said beam, said modulation producing variations in the outputs of said portions comprising frequency components within said range; means for modulating the intensity of said beam at a frequency external to said range, said last-named modulation and the successive impingements of said beam upon said first and second portions cooperating to produce variations in said outputs comprising frequency components external to said range; and means for deriving from said outputs a signal representative solely of variations in said outputs comprising frequency components external to said range.

3. In a cathode ray tube system: a cathode ray tube comprising a source of an electron beam and a beam interceptive structure including a fluorescent screen structure and also having first and second portions, said portions being responsive to beam impingement to produce outputs which vary in response to variations in beam intensity, the relationship between said outputs and the intensity of said beam being different for said first and second portions; means for deflecting said beam to impinge said beam successively upon said first and second portions of said beam interceptive structure; a source of an image signal comprising components within a predetermined first frequency range; means responsive to said image signal to modulate the intensity of said beam to control the light emission from said fluorescent screen structure, said modulation and the successive impingement of said beam upon said first and second portions also producing variations in the outputs of said portions comprising frequency components within a predetermined second range; means for modulating the intensity of said beam at such frequency that said last-named modulation and the successive impingements of said beam upon said first and second portions cooperatively produce variations in said outputs comprising a frequency component external to both said predetermined ranges; and means for deriving from said outputs a signal representative solely of variations in said outputs comprising frequency components external to both said ranges.

4. In a cathode ray tube system: a cathode ray tube comprising an electron interceptive structure, means for projecting electrons towards said structure, means for controlling the path followed by said projected electrons so as to impinge said electrons upon a small region of said structure, said structure including a fluorescent screen structure and also having first and second portions, said portions being responsive to electron impingement to produce outputs which vary in response to variations in the number of electrons impingent thereon, the relationship between said outputs and the said number of impingent electrons being different for said first and second portions; means for deflecting said electrons to impinge said electrons successively upon said first and second portions of said electron interceptive structure; a source of an image signal comprising components within a predetermined frequency range; means responsive to said image signal to modulate the number of electrons impingent upon said structure to control the light emission from said fluorescent screen structure, said modulation also producing variations in the outputs of said portions comprising frequency components within said range; means for modulating the said number of impingent electrons at a frequency external to said range, said last-named modulation and the successive impingements of said electrons upon said first and second portions cooperating to produce variations in said outputs comprising frequency components external to said range; and means for deriving from said outputs a signal representative solely of variations in said output comprising frequency components external to said range.

5. In a cathode ray tube system: a cathode ray tube comprising a source of an electron beam and a beam interceptive structure including a fluorescent screen structure and also having first and second portions, said portions being responsive to beam impingement to produce outputs which vary in response to variations in beam intensity, the relationship between said outputs and the intensity of said beam being different for said first and second portions; means for deflecting said beam to impinge said beam successively upon said first and second portions of said beam interceptive structure; a source of an image signal comprising components within a predetermined frequency range; means responsive to said image signal to modulate the intensity of said beam to control the light emission from said fluorescent screen structure; means for modulating the intensity of said beam at such a frequency that said last-named modulation and the successive impingements of said beam upon said first and second portions cooperatively produce variations in said outputs comprising a component at a frequency external to said predetermined range and different from harmonic frequencies of said image signal components; and means for deriving from said outputs a signal representative solely of variations in said outputs comprising frequency components external to said range.

6. In a cathode ray tube system: a cathode ray tube comprising a source of an electron beam and a beam interceptive structure including a fluorescent screen structure and also having first and second portions, said portions being responsive to beam impingement to produce outputs which vary in response to variations in beam intensity, the relationship between said outputs and the intensity of said beam being different for said first and second portions; means for deflecting said beam to impinge said beam successively upon said first and second portions of said beam interceptive structure; a source of an image signal comprising components within a predetermined frequency range; means responsive to said image signal to modulate the intensity of said beam to control the light emission from said fluorescent screen structure, said modulation also producing variations in the outputs of said portions comprising frequency components within said range; a source of carrier signal of a frequency external to said range; means for modulating the intensity of said beam in accordance with said carrier signal, said last-named modulation and the successive impingements of said beam upon said first and second portions cooperating to produce variations in said outputs comprising frequency components external to said range; and means for deriving from said outputs a signal representative solely of variations in said outputs comprising frequency components external to said range.

7. In a cathode ray tube system: a cathode ray tube comprising a source of an electron beam and a beam interceptive structure including a fluorescent screen structure and also having first and second portions, said portions being responsive to beam impingement to produce outputs which vary in proportion to the variations in beam intensity, the factors of proportionality between the output and the intensity of said beam being different for said first and second portions; means for deflecting said beam to impinge said beam successively upon said first and second portions of said beam interceptive structure; a source of an image signal comprising components within a predetermined frequency range; means responsive to said image signal to modulate the intensity of said beam to control the light emission from said fluorescent screen structure, said modulation also producing variations in the outputs of said portions comprising frequency components within said range; means for modulating the intensity of said beam at a frequency external to said range, said last-named modulation and the successive impingement of said beam upon said first and second portions cooperating to produce variations in said outputs comprising frequency components external to said range; and means for deriving from said outputs a signal representative solely of variations in said outputs comprising frequency components external to said range.

8. In a cathode ray tube system: a cathode ray tube comprising a source of an electron beam and a beam interceptive structure including a fluorescent screen structure and also having first and second portions, said portions being responsive to beam impingement to produce outputs which vary in response to variations in beam intensity, the relationship between said outputs and the intensity of said beam being different for said first and second portions; means for deflecting said beam to impinge said beam successively upon said first and second portions of said beam interceptive structure; a source of an image signal comprising components within a predetermined frequency range and having recurring time spaced portions representative of intelligence, said source of image signal being controllable to vary the rate of recurrence of said portions; means responsive to said image signal to modulate the intensity of said beam to control the light emission from said fluorescent screen structure, said modulation also producing variations in the output of said portions comprising frequency components within said range; means for modulating the intensity of said beam at a frequency external to said range; said last-named modulation and the successive impingement of said beam upon said first and second portions cooperating to produce variations in said outputs comprising frequency components external to said range; and means for deriving from said outputs a signal representative solely of variations in said outputs comprising frequency components external to said range.

9. In a cathode ray tube system: a cathode ray tube comprising a source of an electron beam and a beam interceptive structure including a fluorescent screen structure and also having first and second portions, said portions being responsive to beam impingement to produce outputs which vary in response to variations in beam intensity, the relationship between said outputs and the intensity of said beam being different for said first and second portions; means for deflecting said beam to impinge said beam successively upon said first and second portions of said beam interceptive structure; a source of an image signal comprising components within a predetermined frequency range; means responsive to said image signal to modulate the intensity of said beam to control the light emission from said fluorescent screen structure, said modulation also producing variations in the outputs of said portions comprising frequency components within said range; means for modulating the intensity of said beam at a frequency external to said range, said last-named modulation and the successive impingements of said beam upon said first and second portions cooperating to produce variations in said outputs comprising frequency components external to said range, said variations comprising a carrier component of frequency determined by said last-named modulation and modulation components of frequency determined by the rate of traversal of said first and second portions by said beam; and means for deriving from said outputs a signal representative solely of said modulation components.

10. In a cathode ray tube system: a cathode ray tube comprising a source of an electron beam and a beam interceptive structure including a fluorescent screen structure and also having first and second portions of different predetermined secondary electron emissivity; means for deflecting said beam to impinge said beam successively upon said first and second portions of said beam interceptive structure; a source of an image signal comprising components within a predetermined frequency range; means responsive to said image signal to modulate the intensity of said beam to control the light emission from said fluorescent screen structure, said modulation also producing variations in the secondary electron emission of said portions comprising frequency components within said range; means for modulating the intensity of said beam at a frequency external to said range, said last-named modulation and the successive impingement of said beam upon said first and second portions cooperating to produce variations in said secondary electron emission comprising frequency components external to said range; and means for deriving from said secondary electron emission a signal representative solely of variations in said secondary electron emission comprising frequency components external to said range.

11. A cathode ray tube system comprising: a cathode ray tube including a source of an electron beam, a beam interceptive structure having first and second portions of different predetermined secondary electron emissivity, and an electrode arranged to intercept the secondary electrons emitted by said structure; means for periodically deflecting said beam across said structure so as to impinge said beam successively upon said first and second portions; a source of an image signal comprising components within a predetermined frequency; means responsive to said image signal to modulate the intensity of said beam; means for modulating the intensity of said beam with a carrier signal having a frequency external to said range, said last-named modulation and the successive impingements of said beam upon said first and second portions cooperating to produce variations in secondary electron emission comprising frequency components external to said range; and means for deriving from said variations a voltage which varies solely in proportion to variations in secondary electron emission comprising frequency components external to said range.

12. A system according to claim 11 and comprising additional means supplied with said last-named voltage and with said carrier signal and operative to produce a heterodyne component thereof which is representative solely of variations in secondary electron emission from said screen structure as said beam traverses said first and second portions.

13. A cathode ray tube system comprising: a cathode ray tube including a source of an electron beam, a beam interceptive structure having first and second portions of different predetermined secondary electron emissivity, and an electrode arranged to intercept secondary electrons emitted by said structure; means for periodically deflecting said beam across said structure so as to impinge said beam successively upon said first and second portions; a source of an image signal comprising components within a predetermined frequency range; means responsive to said image signal to modulate the intensity of said beam; means for modulating the intensity of said beam with a carrier signal having a frequency external to said range, said last-named modulation and the successive impingements of said beam upon said first and second portions cooperating to produce variations in the secondary electron emission comprising frequency components external to said range, said variations comprising a carrier component of frequency determined by said last-named modulation and modulation components of frequency determined by the rate of traversal of said first and second portions by said beam; and means for deriving from said secondary electron emission a signal representative solely of said modulation components.

14. A cathode ray tube system comprising: a cathode ray tube including a source of an electron beam, a beam interceptive structure having first and second portions of different predetermined secondary electron emissivity, and an electrode arranged to intercept secondary electrons emitted by said structure; means for periodically deflecting said beam across said structure so as to impinge said beam successively upon said first and second portions; a source of an image signal comprising components within a predetermined frequency range; means responsive to said image signal to modulate the intensity of said beam; means for modulating the intensity of said beam with a carrier signal having a frequency external to said range, said last-named modulation and the successive impingements of said beam upon said first and second portions cooperating to produce variations in the secondary electron emission comprising frequency components external to said range, said variations comprising a carrier component of frequency determined by said last-named modulation and a plurality of modulation sideband components of frequencies determined by the rate of traversal of said first and second portions by said beam; and means for deriving from said outputs a signal representative solely of one of said modulation components.

15. In a cathode ray tube system: a cathode ray tube comprising a source of on electron beam and a beam interceptive structure including a plurality of parallelly disposed strips of fluorescent material responsive to electron beam impingement to produce different visible indications thereof and also having first and second portions arranged in predetermined geometrical relationship with respect to said fluorescent strips, said portions having different secondary electron emissivities; means for deflecting said beam to impinge said beam successively upon different ones of said fluorescent strips and also to impinge said beam successively upon said first and second portions; a source of an image signal comprising components within a predetermined frequency range and being representative of different intelligence at time-spaced intervals recurring at a predetermined rate, said source being controllable to vary said rate of recurrence; a source of a carrier signal of frequency external to said range; means responsive to both said image signal and said carrier signal to modulate the intensity of said beam, the modulation of said beam and the successive impingement of said beam upon said first and second portions of said screen structure producing variations in the secondary electron emission from said screen structure comprising frequency components external to said range; means for deriving from said secondary electron emission a signal representative solely of variations in said emission comprising frequency components external to said range; and means for utilizing said derived signal to control said source of image signal to vary the said rate of recurrence of intelligence representative intervals.

16. In a cathode ray tube system: a cathode ray tube comprising a source of an electron beam and a beam interceptive structure including a plurality of parallelly disposed strips of fluorescent material responsive to electron beam impingement to produce light of different colors and also having first and second portions arranged in predetermined geometrical relationship with respect to said fluorescent strips, said portions having different secondary electron emissivities; means for deflecting said beam transversely of said strips so as to impinge said beam successively upon different ones of said strips in predetermined order and also to impinge said beam successively upon said first and second portions; a source of an image signal comprising components within a predetermined frequency range, said image signal being representative of intelligence respecting said different colors at time spaced intervals recurring at a predetermined rate and occurring in said predetermined order, said source being controllable to vary said rate of recurrence; means responsive to said image signal to modulate the intensity of said beam said modulation and successive impingement of said beam upon said first and second portions cooperatively producing variations in secondary electron emission from said screen structure having frequency components within said range; a source of a carrier signal of frequency external to said range; means responsive to said carrier signal to modulate the intensity of said beam, said last-named modulation of said beam and the successive impingement of said beam upon said first and second portions of said screen structure cooperatively producing variations in the secondary electron emission from said screen structure having frequency components external to said range; means for deriving from said secondary emission a signal representative solely of variations in said emission comprising frequency components external to said range; and means for utilizing said last-named signal to control said source of image signal to vary the said rate of recurrence of color representative image signal intervals.

17. In a cathode ray tube system: a cathode ray tube comprising a source of an electron beam and a beam interceptive structure including a plurality of parallelly disposed strips of fluorescent material responsive to electron beam impingement to produce different visible indications thereof and also having first and second portions arranged in predetermined geometrical relationship with respect to said fluorescent strips, said portions having different secondary electron emissivities; means for deflecting said beam to impinge said beam successively upon different ones of said fluorescent strips and also to impinge said beam successively upon said first and second portions; means for producing an image signal having frequency components within a predetermined frequency range and being representative of different intelligence at time-spaced intervals recurring at a predetermined rate, said last-named means comprising a source of carrier signal of frequency external to said range, means cooperating with said source to produce a signal of carrier signal frequency and representative of said different intelligence at time-spaced intervals, means responsive to said carrier signal to modulate the intensity of said electron beam, said modulation and successive impingements of said beam upon said first and second portions of said beam interceptive structure producing variations in secondary electron emission from said structure having frequency components external to said range, means for deriving from said variations a signal representative solely of variations having frequency components external to said range, a mixer supplied with said derived signal and with said intelligence representative signal of carrier frequency, said mixer being operative to produce heterodyne components of said supplied signals, and means for deriving from said mixer heterodyne frequency components within said predetermined range; and means responsive to said mixer derived components to modulate the intensity of said beam.

18. In a cathode ray tube system: a cathode ray tube comprising a source of an electron beam and a beam interceptive structure including a plurality of parallelly disposed strips of fluorescent material responsive to electron beam impingement to produce different visible indications thereof and also having first and second portions arranged in predetermined geometrical relationship with respect to said fluorescent strips, said portions having different secondary electron emissivities; means for deflecting said beam to impinge said beam successively upon different ones of said fluorescent strips and also to impinge said beam successively upon said first and second portions; a source of an image signal comprising components within a predetermined frequency range and being representative of different intelligence at time spaced intervals recurring at a predetermined rate; a source of a reference signal whose frequency is indicative of the rate of recurrence of said intervals of said image signal; a source of a carrier signal of frequency external to said range; means responsive to said carrier signal to modulate the intensity of said beam, the modulation of said beam and the successive impingements of said beam upon said first and second portions of said screen structure producing variations in secondary electron emission from said screen structure comprising frequency components external to said range; means for deriving from said secondary emission a signal representative solely of variations in said secondary emission comprising frequency components external to said range; a first mixer supplied with said derived signal and with said reference signal; means for deriving from said first mixer a heterodyne component produced by mixing of said derived component and said reference signal; a second mixer supplied with the said heterodyne component derived from said first mixer and with said image signal; means for deriving from said second mixer a heterodyne component produced by mixing of the said supplied heterodyne component and image signal; and means responsive to said last-named heterodyne component to modulate the intensity of said beam with a signal proportional to said last-named heterodyne component.

EDGAR M. CREAMER, Jr.
MELVIN E. PARTIN.

References Cited in the file of this patent

UNITED STATES PATENTS

| Number | Name | Date |
|---|---|---|
| 2,530,431 | Huffman | Nov. 21, 1950 |
| 2,545,325 | Weimer | Mar. 13, 1951 |